Figure 2:
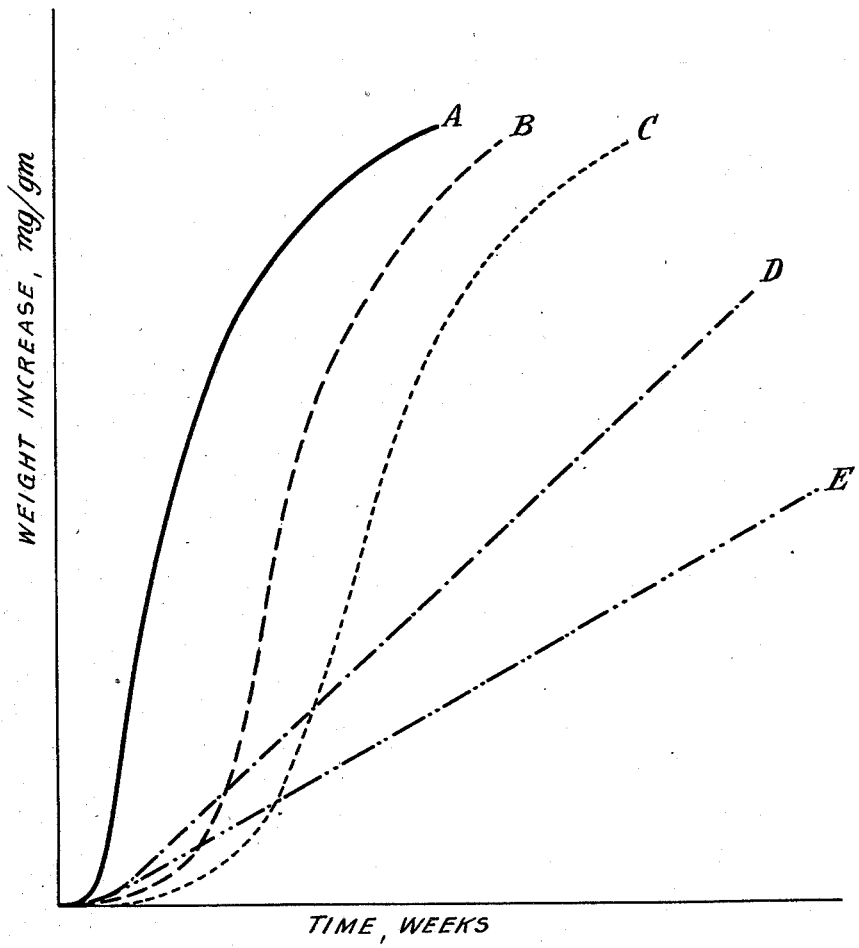

Aug. 11, 1936.  A. E. BRIOD  2,050,689
PROCESS FOR CONTROLLING THE OXIDATION OF CERTAIN ORGANIC
COMPOUNDS AND THE PRODUCTS PRODUCED THEREBY
Filed Dec. 31, 1931  2 Sheets-Sheet 1
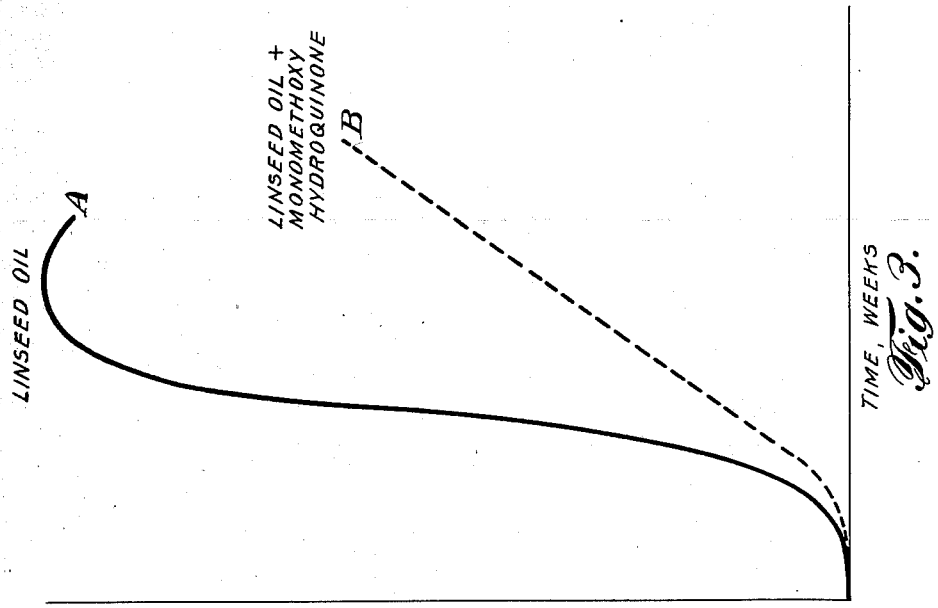
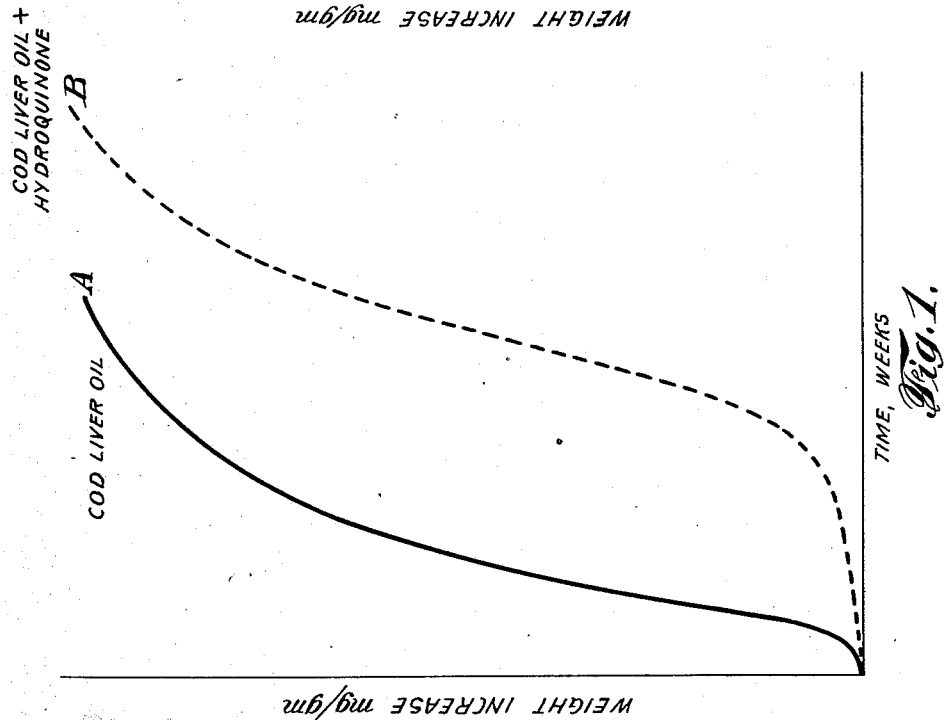
INVENTOR
André E. Briod
BY
ATTORNEY Patented Aug. 11, 1936

2,050,689

UNITED STATES PATENT OFFICE 2,050,689

PROCESS FOR CONTROLLING THE OXIDATION OF CERTAIN ORGANIC COMPOUNDS AND THE PRODUCTS PRODUCED THEREBY

André E. Briod, Newark, N. J., assignor to National Oil Products Company, Harrison, N. J., a corporation of New Jersey Application December 31, 1931, Serial No. 584,128

2 Claims. (Cl. 87—9)

My invention relates to processes for obtaining straight line oxidation effects in unsaturated fatty acids, their esters and derivatives as opposed to the well known S-shaped oxidation line, or autocatalytic line, usually obtainable from these organic compounds and to the products produced by my process.

As is well known, the oxidation of many unsaturated organic compounds and, more specifically, the oxidation of unsaturated fatty acids, their esters and derivatives, usually proceeds at a constantly increasing rate up to a certain level of oxidation. This property is due to the autocatalytic nature of the reactions involved, the rate of oxidation being constantly increased by the new products of oxidation formed.

If the amount of oxygen thus combined is plotted against the time of exposure to oxidation, the familiar S curve of autocatalytic reactions is obtained as shown in the linseed oil curve in Figure 3 and in the cod liver oil curve in Figure 2.

The period during which the rate of oxidation remains negligible is known as the induction period. The length of the induction period naturally varies with the unsaturated compounds under consideration.

It has been previously found by investigators that the addition of small quantities of suitable materials, termed anti-oxygens, or antioxidants, by these investigators, act in prolonging to a variable extent the length of the induction period, when unsaturated organic compounds are exposed to oxidation. This exposure to oxidation may result from various internal or external factors, such as peroxides already present in these materials or exposure to atmospheric oxygen. The number of compounds which exhibit this property of lengthening the induction period is quite large and, for the purpose of illustration, I must limit myself to mentioning the best known of these compounds, namely hydroquinone.

When an unsaturated oil containing hydroquinone, for example cod liver oil to which .025% hydroquinone has been added, is subjected to oxidation, together with a sample of the same oil not containing hydroquinone, the length of the induction period is greatly increased, as shown in Figure 1, in which A represents the autocatalytic line of cod liver oil and in which B represents the autocatalytic line of cod liver oil and hydroquinone.

It is readily seen that, whenever the hydroquinone has become inactive (through oxidation, condensation or otherwise), the rate of oxidation again assumes the autocatalytic character noted with the oil which did not contain hydroquinone. The only effect of hydroquinone addition has been a lengthening of the induction period. This experiment is but a confirmation of the findings of many investigators.

In my work on oxidation of unsaturated fatty acids, their esters and derivatives, I have found that there are compounds which, while they do not prolong the induction period to any material extent, act in preventing the oxidation to assume an autocatalytic character. In contrast to antioxidants which exhibit their activity only during the period of inductive oxidation, these new materials show their effect during the period of active oxidation which follows the induction period.

Instead of the S curve previously mentioned, the rate of oxidation is controlled to such an extent that it becomes represented by a practically straight line, the slope of which varies with the autooxidizable material under consideration and with the amount of material used to prevent autocatalysis.

From among the anti-autocatalysts suitable for the following of my invention, I mention the following monomethoxy hydroquinone.

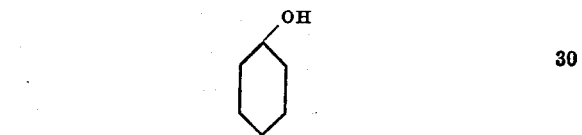

monomethoxy-pyrogallol

and dimethoxy-pyrogallol

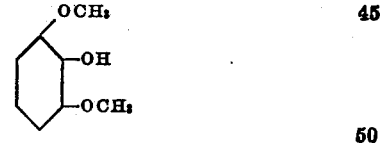

In order to better to better illustrate my invention, I will now give some examples of results obtained with this new method of controlling the rate of oxidation and I will also contrast it with the use of materials such as antioxidants.

Example 1

Into identical samples of fresh medicinal cod liver oil, the following materials were dissolved:—

| | | |
|---|---|---|
| A | None | (blank) |
| B | .025% | Catechol |
| C | .050% | Catechol |
| D | .070% | 1–3 dimethoxypyrogallol |
| E | .140% | 1–3 dimethoxypyrogallol |

Equal samples of each of these oils were weighed into small open containers of similar size and shape, which were then placed into a constant temperature oven maintained at 40° C. during the course of exposure of these samples to oxidation. The containers were weighed at weekly intervals to determine the increase in weight, which is known to be a relative measure of the extent to which oxidation has taken place.

Upon plotting these weight increases against the time of exposure, the curves shown in Figure 2 were obtained, the letters upon the drawing corresponding with the above mentioned letters.

While catechol, a well known antioxidant, acts solely in prolonging the induction period and does not prevent autocatalysis of the oxidation reactions which subsequently set in, it is readily observed in Figure 2 that such is not the case with dimethoxypyrogallol. This compound, while it does not prolong the induction period, definitely prevents autocatalysis during active oxidation. The rate of this linear oxidation is also shown to decrease when the amount of dimethoxypyrogallol is increased.

Example 2

Into one half of a fresh sample of linseed oil, .1% of monomethoxyhydroquinone was dissolved. The oil thus prepared was then tested for oxidation, together with samples of the oil which did not contain monomethoxyhydroquinone, using the procedure given in Example 1. The relative oxidation curves obtained in this example are shown in Figure 3, in which the line A represents linseed oil and the line B represents linseed oil and monomethoxyhydroquinone.

Here again, while monomethoxyhydroquinone does not prolong the induction period, it acts as a regulator of oxidation by controlling autocatalysis to such an extent that the rate of oxidation remains constant and we obtain a practically straight oxidation line.

Having thus ascertained by a suitable method that dimethoxypyrogallol and monomethoxyhydroquinone are compounds which prevent autocatalysis when added to unsaturated fatty acids or their derivatives and combinations of same, I add them to substances containing unsaturated fatty acid radicals whenever the benefits to be derived from the prevention of autocatalysis during oxidation are desired. These benefits may result from a lower oxidation rate, a constant oxidation rate, or both, or from other differences in the reactions involved.

In view of the great reactivity of the secondary products formed during autooxidation of unsaturated organic compounds, it was not believed that their action as autocatalysts could be efficiently controlled. My invention now makes it possible to attain this result in a manner which is both efficient and economical.

While I have mentioned the use of dimethoxypyrogallol and monomethoxyhydroquinone in the performance of my invention, as preventives of autocatalysis during oxidation of unsaturated organic compounds, it must be understood that I do not limit myself to the use of these materials only, as any compound which, will materially prevent autocatalysis during oxidation can be substituted therefor, within the scope of my invention. Whether these compounds are added as such, or whether they are added in combinations designed to produce the same effect through subsequent reactions in the autooxidizable substance, is also understood to be covered by the present specifications.

The simultaneous presence, in the autooxidizable mixture, of antioxidants (e. g. hydroquinone) and of compounds added to prevent autocatalysis, is not to be construed as materially departing from the purpose of the above disclosure.

By "anti-autocatalytic" compounds, or "anti-autocatalysts", I mean those compounds which, when added to unsaturated fatty acids, their esters and derivatives, will produce a practically straight oxidation line after the induction period of the product to which it is added, and among such anti-autocatalytic compounds, I have found that the ethers of polyhydroxy-phenols having at least one free hydroxyl group and their derivatives, are particularly suitable.

By "unsaturated organic compounds" I mean both oils and fats which ordinarily produce autocatalytic oxidation lines when exposed to the action of oxidizing effects, among which oils and fats may be mentioned linseed oil, cod liver oil, cottonseed oil, stearin and tallow, but I do not limit myself to these mentioned organic compounds.

I do not limit myself to the particular quantities, chemicals or steps of procedure specifically mentioned as these are given simply as a means for clearly describing my invention.

What I claim is:—

1. In a process for producing a practically straight oxidation line of organic compounds, the step which comprises adding mono-methoxy hydroquinone to cod-liver oil.

2. A composition of matter produced by adding mono-methoxy hydroquinone to cod-liver oil, said composition of matter having a practically straight oxidation line.

ANDRÉ E. BRIOD.